(12) United States Patent
Stanley et al.

(10) Patent No.: US 9,053,492 B1
(45) Date of Patent: Jun. 9, 2015

(54) CALCULATING FLIGHT PLANS FOR RESERVATION-BASED AD SERVING

(75) Inventors: Barbara Stanley, Mountain View, CA (US); Gagan Aggarwal, Sunnyvale, CA (US); Gurmeet Singh Manku, Mountain View, CA (US); Anurag Agarwal, Sunnyvale, CA (US); Dawn Chamberlain, Mountain View, CA (US); Gaurav Jain, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1085 days.

(21) Appl. No.: 11/551,151

(22) Filed: Oct. 19, 2006

(51) Int. Cl.
*G06Q 30/00* (2012.01)
*G06Q 30/02* (2012.01)

(52) U.S. Cl.
CPC .................................. *G06Q 30/0224* (2013.01)

(58) Field of Classification Search
CPC .......... G06Q 30/0241; G06Q 30/0242; G06Q 30/0243; G06Q 30/0244
USPC ....................................................... 705/1, 14
See application file for complete search history.

(56) References Cited

U.S. PATENT DOCUMENTS

| | | |
|---|---|---|
| 4,953,106 A | 8/1990 | Gansner et al. |
| 5,636,346 A | 6/1997 | Saxe |
| 5,724,521 A | 3/1998 | Dedrick |
| 5,740,549 A | 4/1998 | Reilly et al. |
| 5,752,000 A | 5/1998 | McGeer et al. |
| 5,848,397 A | 12/1998 | Marsh et al. |
| 5,948,061 A | 9/1999 | Merriman |
| 5,956,693 A | 9/1999 | Geerlings |
| 6,026,368 A | 2/2000 | Brown et al. |
| 6,029,176 A | 2/2000 | Cannon |
| 6,029,195 A | 2/2000 | Herz |
| 6,044,376 A | 3/2000 | Kurtzman, II |
| 6,078,914 A | 6/2000 | Redfern |
| 6,128,663 A | 10/2000 | Thomas |
| 6,134,532 A * | 10/2000 | Lazarus et al. ............. 705/14.25 |
| 6,144,944 A | 11/2000 | Kurtzman, II et al. |
| 6,167,382 A | 12/2000 | Sparks et al. |
| 6,182,050 B1 | 1/2001 | Ballard |
| 6,269,361 B1 | 7/2001 | Davis et al. |
| 6,286,005 B1 | 9/2001 | Cannon |
| 6,401,075 B1 | 6/2002 | Mason et al. |

(Continued)

OTHER PUBLICATIONS

Ahuja, Ravindra K., et al, *Network Flows, Theory, Algorithms, and Applications*, (Prentice Hall, Englewood Cliffs, New Jersey, 1993); front and back covers and publication page, 4 pages; table of contents, pp. v-x; Chapter 1, pp. 1-22; and Chapters 6-8, pp. 166-293.

Google, AdSense, "What's AdSense?", [online], pp. 1-10, retrieved from <http://www.google.com/adsense>, site visited Apr. 30, 2007.

DoubleClick, *Dart for Publishers*, [online], 1 page, retrieved from <http://www.doubleclick.com/us/products/dfp/>, site visited Apr. 30, 2007.

Advertising.com, *Programs*, Advertising.com, Inc., [online], 2 pages, retrieved from <http://www.advertising.com/publishers/programs.php>, site visited Apr. 30, 2007.

(Continued)

*Primary Examiner* — James A Reagan

(74) *Attorney, Agent, or Firm* — Fish & Richardson P.C.

(57) ABSTRACT

The disclosure provides various embodiments of systems, methods, and software for supporting server-side product catalogs. Software for managing ad serving may comprise computer readable instructions embodied on media and be operable to identify a logically local directed graph representing a logically remote network property associated with a publisher. The network property is associated with at least one product catalog representing a package of network ad slots. The software may then generate an ad service flight plan for serving various ones of a plurality of ads associated with a first of the network ad slots using an iterative solution on the directed graph.

22 Claims, 9 Drawing Sheets

(56) References Cited

U.S. PATENT DOCUMENTS

| | | | |
|---|---|---|---|
| 6,526,531 B1* | 2/2003 | Wang | 714/704 |
| 6,665,656 B1 | 12/2003 | Carter | |
| 6,985,882 B1 | 1/2006 | Del Sesto | |
| 6,990,462 B1 | 1/2006 | Wilcox et al. | |
| 7,039,599 B2 | 5/2006 | Merriman | |
| 7,124,101 B1 | 10/2006 | Mikurak | |
| 7,136,871 B2 | 11/2006 | Ozer et al. | |
| 7,136,875 B2 | 11/2006 | Anderson et al. | |
| 2001/0044758 A1* | 11/2001 | Talib et al. | 705/27 |
| 2001/0047297 A1 | 11/2001 | Wen | |
| 2002/0055880 A1 | 5/2002 | Unold et al. | |
| 2002/0091923 A1* | 7/2002 | Chipman et al. | 713/168 |
| 2002/0112038 A1* | 8/2002 | Hessmer et al. | 709/220 |
| 2002/0116244 A1* | 8/2002 | Honarvar et al. | 705/7 |
| 2002/0138640 A1* | 9/2002 | Raz et al. | 709/231 |
| 2002/0184047 A1* | 12/2002 | Plotnick et al. | 705/1 |
| 2003/0093792 A1 | 5/2003 | Labeeb et al. | |
| 2003/0110171 A1 | 6/2003 | Ozer et al. | |
| 2003/0149622 A1* | 8/2003 | Singh et al. | 705/14 |
| 2003/0171990 A1* | 9/2003 | Rao et al. | 705/14 |
| 2003/0182656 A1* | 9/2003 | Leathers et al. | 717/177 |
| 2003/0200350 A1 | 10/2003 | Kumar et al. | |
| 2003/0208399 A1 | 11/2003 | Basak et al. | |
| 2003/0220837 A1 | 11/2003 | Asayama | |
| 2003/0229900 A1* | 12/2003 | Reisman | 725/87 |
| 2004/0054589 A1 | 3/2004 | Nicholas et al. | |
| 2004/0059708 A1 | 3/2004 | Dean et al. | |
| 2004/0073919 A1 | 4/2004 | Gutta et al. | |
| 2004/0093286 A1 | 5/2004 | Cooper et al. | |
| 2004/0093327 A1 | 5/2004 | Anderson et al. | |
| 2004/0138959 A1* | 7/2004 | Hlavac et al. | 705/26 |
| 2004/0225562 A1 | 11/2004 | Turner | |
| 2005/0027587 A1 | 2/2005 | Latona et al. | |
| 2005/0049915 A1 | 3/2005 | Mehta et al. | |
| 2005/0055271 A1 | 3/2005 | Axe et al. | |
| 2005/0065844 A1 | 3/2005 | Raj et al. | |
| 2005/0108084 A1 | 5/2005 | Ramamoorti et al. | |
| 2005/0180549 A1* | 8/2005 | Chiu et al. | 379/88.16 |
| 2005/0203796 A1* | 9/2005 | Anand et al. | 705/14 |
| 2005/0234802 A1 | 10/2005 | Zhang et al. | |
| 2005/0251443 A1 | 11/2005 | Chan et al. | |
| 2005/0251444 A1 | 11/2005 | Varian et al. | |
| 2005/0267799 A1 | 12/2005 | Chan et al. | |
| 2006/0106709 A1 | 5/2006 | Chickering et al. | |
| 2006/0173865 A1* | 8/2006 | Fong | 707/100 |
| 2006/0212350 A1* | 9/2006 | Ellis et al. | 705/14 |
| 2006/0224445 A1 | 10/2006 | Axe et al. | |
| 2006/0293951 A1* | 12/2006 | Patel et al. | 705/14 |
| 2007/0005421 A1 | 1/2007 | Labio et al. | |
| 2007/0022032 A1 | 1/2007 | Anderson et al. | |
| 2007/0073583 A1 | 3/2007 | Grouf et al. | |
| 2007/0088603 A1 | 4/2007 | Jouppi et al. | |
| 2007/0094082 A1* | 4/2007 | Yruski et al. | 705/14 |
| 2007/0143296 A1 | 6/2007 | Casion | |
| 2007/0150353 A1 | 6/2007 | Kassner et al. | |
| 2007/0156677 A1* | 7/2007 | Szabo | 707/5 |
| 2007/0157228 A1 | 7/2007 | Bayer et al. | |
| 2007/0192217 A1* | 8/2007 | O'Kelley et al. | 705/28 |
| 2007/0244750 A1* | 10/2007 | Grannan et al. | 705/14 |
| 2007/0244766 A1 | 10/2007 | Goel | |
| 2007/0260520 A1* | 11/2007 | Jha et al. | 705/14 |
| 2007/0282785 A1* | 12/2007 | Fayyad et al. | 707/1 |
| 2008/0004954 A1* | 1/2008 | Horvitz | 705/14 |
| 2008/0004962 A1* | 1/2008 | Muthukrishnan et al. | 705/14 |
| 2008/0033799 A1* | 2/2008 | McKenna et al. | 705/14 |
| 2008/0052152 A1* | 2/2008 | Yufik | 705/14 |
| 2010/0191558 A1 | 7/2010 | Chickering et al. | |
| 2011/0251875 A1 | 10/2011 | Cosman | |
| 2011/0270674 A1 | 11/2011 | Cosman | |

OTHER PUBLICATIONS

AOL, *Advertising Products*, [online], 2 pages, retrieved from <http://aolmedianetworks.com/index.php?id=1966&no_cache=1>, site visited May 1, 2007.

U.S. Appl. No. 95/001,061, filed Sep. 3, 2002, Reexamination of Stone et al.
U.S. Appl. No. 95/001,068, filed Dec. 7, 2002, Reexamination of Stone et al.
U.S. Appl. No. 95/001,069, filed Jul. 11, 2002, Reexamination of Dean et al.
U.S. Appl. No. 95/001,073, filed Sep. 30, 2004, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 6,446,045 B1, Control No. 95/001,061.
Request for Reexamination of U.S. Patent No. 6,829,587 B2, Control No. 95/001,068.
Request for Reexamination of U.S. Patent No. 7,249,059 B2, Control No. 95/001,069.
Request for Reexamination of U.S. Patent No. 7,240,025 B2, Control No. 95/001,073.
U.S. Appl. No. 11/551,065.
U.S. Appl. No. 11/551,177.
U.S. Appl. No. 11/551,154.
U.S. Appl. No. 11/551,161.
Anderson. Henrik Reif, *An Introduction to Binary Decision Diagrams*, Lecture Notes for 49285 Advanced Algorithms E97, Oct. 1997. Department of Information Technology, Technical University of Denmark.
Nakamura, Atsuyoshi, *Improvements in Practical Aspects of Optimally Scheduling Web Advertising*, NEC Internet Systems Research Laboratories, May 7-11, 2002, Honolulu, Hawaii.
Office Action issued in U.S. Appl. No. 11/551,065 on Jun. 28, 2012, 53 pages.
Office Action issued in U.S. Appl. No. 11/551,065 on Jan. 25, 2013, 53 pages.
Office Action issued in U.S. Appl. No. 11/551,065 on Feb. 26, 2014.
Office Action issued in U.S. Appl. No. 11/551,177 on Mar. 4, 2014, 25 pages.
Office Action issued in U.S. Appl. No. 11/551,154 on Feb. 27, 2014, 34 pages.
Office Action issued in U.S. Appl. No. 11/551,161 on Jan. 27, 2012, 14 pages.
Office Action issued in U.S. Appl. No. 11/551,161 on Nov. 2, 2012, 16 pages.
Office Action issued in U.S. Appl. No. 11/551,065 on Oct. 21, 2014, 16 pages.
Office Action issued in U.S. Appl. No. 11/551,177 on Nov. 3, 2014, 31 pages.

* cited by examiner

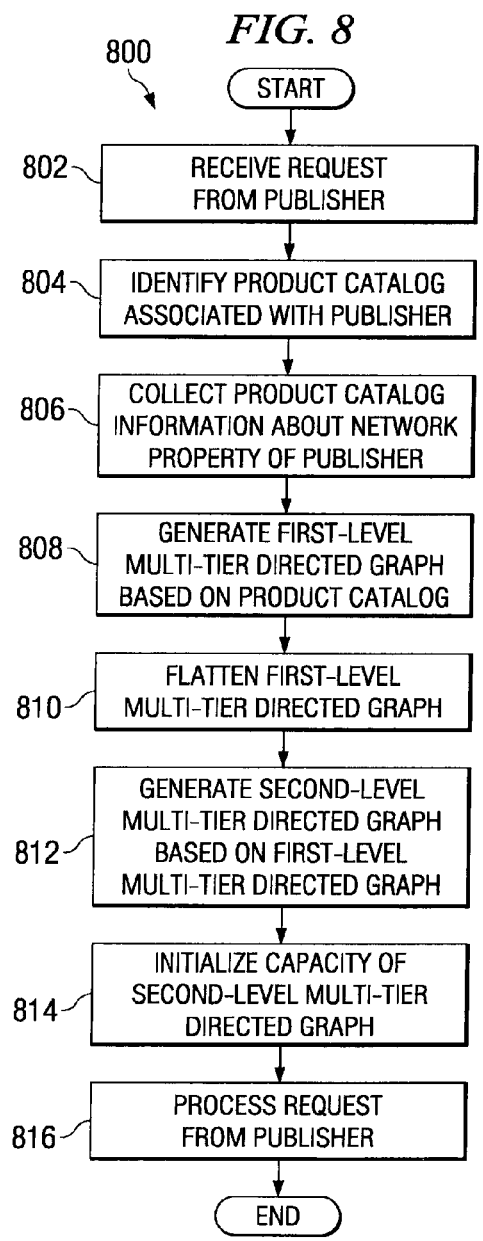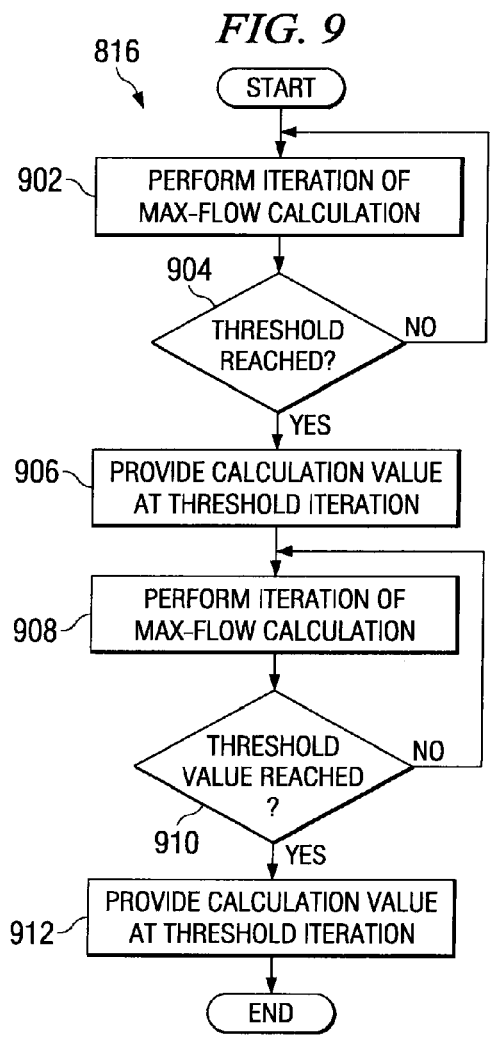

CALCULATING FLIGHT PLANS FOR RESERVATION-BASED AD SERVING

TECHNICAL FIELD

This disclosure relates to advertising systems and methods and, more particularly, to managing network ad inventory in a networked, distributed, or other interactive environment.

BACKGROUND

Recently, advertising over more interactive media has become popular. For example, as the number of people using the Internet has exploded, advertisers have come to appreciate and utilize media and services offered over the Internet as a potentially powerful way to advertise. Interactive advertising often provides opportunities for advertisers to target their advertisements ("ads") to a more appropriate or receptive audience. In other words, targeted ads are more likely to be useful to end users since the ads may be relevant to a need inferred from some user activity (such as relevant to a user's search query to a search engine, relevant to content in a document requested by the user, and so forth), characteristic (e.g., demographics), or the like. For example, query keyword targeting has been used by search engines to deliver relevant ads. In this case, the advertising system may determine which of the eligible ads should actually be displayed to the user, a process which could be based on several different factors. For example, the advertising system can rely on the popularity of the ads, so that more popular ads are displayed more often. Alternatively, the advertising system can rely on a computerized bidding process based on what the advertisers have stated they are willing to pay, so that advertisers willing to pay more are more likely to have their ad displayed. In these cases, advertisers generally want to target their ads to users interested in what they are offering.

SUMMARY

The disclosure provides various embodiments of systems, methods, and software for supporting server-side product catalogs. For example, software for managing ad serving may comprise computer readable instructions embodied on media and be operable to identify a logically local directed graph representing a logically remote network property associated with a publisher. The network property is associated with at least one product catalog representing a package of network ad slots. The software may then generate an ad service flight plan for serving various ones of a plurality of ads associated with a first of the network ad slots using an iterative solution on the directed graph.

The foregoing example software—as well as other disclosed methods—may also be computer implementable methods. Moreover some or all of these aspects may be further included in respective systems for managing network ad inventory, as well as in other enterprise or marketing software. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 8 is a flow chart showing an example of a process for managing network ad inventory;

FIG. 9 is a flow chart showing an example of a process for processing an availability query request from a publisher;

DETAILED DESCRIPTION

Figure 1:
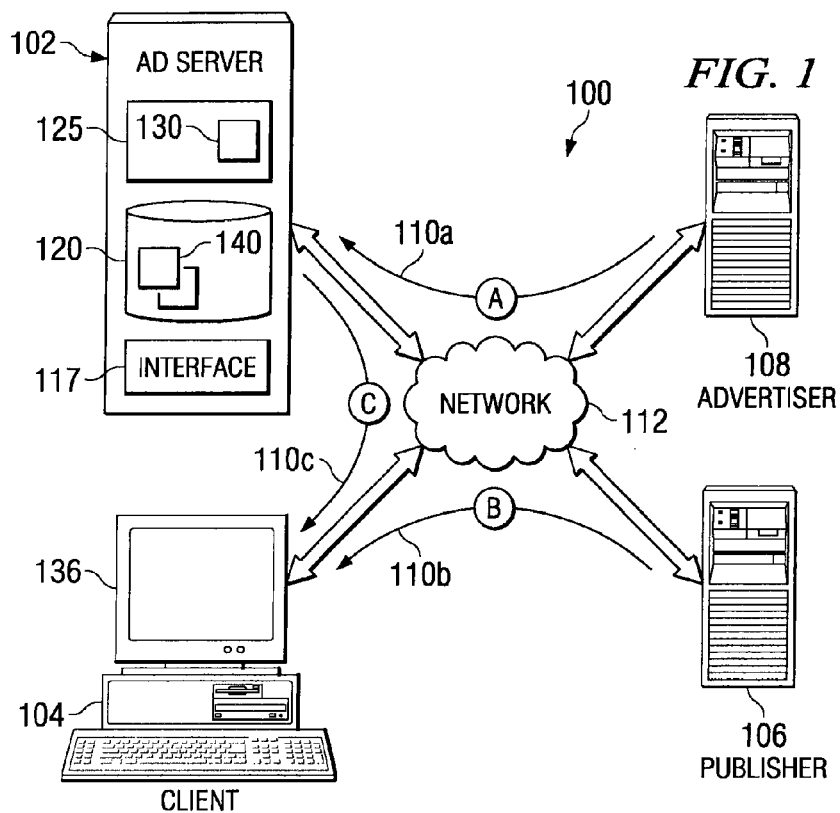
FIG. 1 is a schematic diagram showing an example system for managing network ad inventory.

FIG. 1 is a schematic diagram showing an example system 100 for managing, as well as forecasting, network ad inventory. Generally, system 100 facilitates distributed processing of network ads 140. For example, illustrated system 100 includes an ad server 102, one or more clients 104, one or more publishers 106, and one or more advertisers 108. Generally, ad server 102 stores network ads 140, in a local or distributed memory 120, that may be transmitted to client 104 for presentation in association with the online content from publisher 106. These network ads 140 may include, for example, a rectangular banner ad, an audio ad, a video clip, or any other media, content, or interactive advertisement for placement along with publisher content on, for example, a particular webpage. Advertisers generally provide at least some of these network ads 140 for storage at (or reference by) ad server 102, as indicated by arrow 110a. Publisher 106 provides online content, such as the webpage, an audio and/or video presentation, or an online game to client 104 for presentation at graphical user interface (GUI) 136, as indicated by arrow 110b. Network ad 140 is presented in a particular location, which may be referred to as an ad slot, within the content from publisher 106. For example, the webpage provided by publisher 106 may include a script that identifies a particular network ad 140 (or ad category or type or call for an ad) to retrieve from ad server 102, as indicated by arrow 110c. Through intelligently managing the ad inventory, system 100 may predict, or forecast, how many times the particular ad slot might be presented to users at clients 104, which may be referred to as an impression. System 100 allows advertisers 108 and those at ad server 102 to query the availability of forecasted impressions within ad slots provided by publishers 106. System 100 often allows advertisers 108 to reserve impressions of their network ads 140 within particular ad slots. For example, features of network ads 140 may be matched with information regarding the content presented to users at clients 104.

These network ads 140 are typically presented to the user via client 104, along with the results of his content request (e.g., webpage request or search query). Some advertisements include links to other content sources. If the user selects one of the ads, such as by clicking with a mouse or selecting a link associated with the ad 140, the user can be taken to a web page—occasionally termed a landing page—specified in the ad 140. Network ads 140 may have various intrinsic features. Such features may be specified by an application and/or an advertiser 108, often depending on the type of online ad, and may include one or more of the following: text, a link, an audio file, a video file, an image file, executable code, embedded information, and many others. For example, in the case of a text ad, ad features may include a title line, ad text, and an embedded link. In the case of an image ad, ad features may include images, executable code, and an embedded link.

When network ad 140 is served, one or more parameters may be used to describe how, when, where, to whom, and other conditions under which the ad is to be served. For example, such serving parameters may include one or more of the following: features of (including information on) a document on which, or with which, network ad 140 was served, a search query or search results associated with the serving of network ad 140, a user characteristic (such as his geographic location, the language used by the user, the type of browser used, previous page views, previous behavior, user account, any Web cookies used by the system, user device characteristics, and so forth), a host or affiliate site that initiated the request, an absolute position of network ad 140 on the page on which it was served, a position (spatial or temporal) of network ad 140 relative to other network ads 140 served, an absolute size of network ad 140, a size of network ad 140 relative to other network ads 140, a color of network ad 140, a number of other network ads 140 served, types of other network ads 140 served, time of day served, time of week served, time of year served, etc. Of course, not all of these parameters may be implemented or utilized in every situation and other serving parameters may be used.

Although serving parameters may be extrinsic to ad features, they may be associated with network ad 140 as serving conditions or constraints. When used as serving conditions or constraints, such serving parameters are referred to simply as serving constraints (or targeting criteria). For example, in some systems, advertiser 108 may be able to target the serving of its network ad 140 by specifying that it is to be served on weekdays, no lower than a certain position, to users in a certain location, and so forth. As another example, in some systems, advertiser 108 may specify that its network ad 140 is to be served if a page or search query includes certain keywords or phrases. As yet another example, in some systems, advertiser 108 may specify that its network ad 140 is to be served only if a document being served includes certain topics or concepts, or falls under a particular cluster or clusters, or some other classification or classifications. In some systems, advertiser 108 may specify that its network ad 140 is to be served to (or is not to be served to) user devices having certain characteristics. Finally, in some systems network ad 140 might be targeted so that it is served in response to a request sourced from a particular location, or in response to a request concerning a particular location. In general, network ad 140 is presented in association with online content from publisher 106.

This online content—with or without the network ads 140—provided by publishers 106 is generally referred to here as a network property and may include any machine readable and machine storable work product. The network property may be a file, a combination of files, one or more files with embedded links to other files, and so forth. These files may be of any type, such as text, audio, image, video, or any other appropriate media form. Although properties may themselves be offline, pertinent information about a property is usually available online. Such property may include attributes, topics, concepts, categories, keywords, relevancy information, types of ads supported, and so forth. For example, an outdoor jazz music festival may have entered the topics "music" and "jazz," the location of the concerts, the time of the concerts, artists scheduled to appear at the festival, and types of available ad spots (e.g., spots in a printed program, spots on a stage, spots on seat backs, audio announcements of sponsors, etc.). In many cases, a network property has an addressable storage location and can therefore be uniquely identified by this addressable location. Further, the network property may be logically divided into various sub-properties (such as sub-domains, etc.), with each part thought of as individual network properties. The network property may include structured data containing both content (words, pictures, etc.) and some indication of the meaning of that content or metadata (for example, email fields and associated data, HTML tags and associated data, etc.) Web pages often include content and may include embedded information (such as meta information, hyperlinks, etc.) and/or embedded instructions (such as JavaScript, etc.). Accordingly, ad slots in the network property for presenting network ads 140 may be defined by embedded information or instructions.

The ad slot is often considered the smallest atomic unit that publisher 106 may define using any appropriate technique. For example, an ad request from publisher 106 may have names of the ad slots for which ads are being requested. In another example, it may be identified by a globally unique ad slot identifier in a database or the combination of a publisher-unique ad slot name and the identifier of publisher 106. Publishers 106 are generally encouraged to not reuse ad slot identifiers across (static) pages or on the same page. Generally, each ad slot has one or more attributes associated with it. For example, ad slot attributes may be key-value pairs associated with the particular ad slot. Generally, ad slots have a size (e.g., height and width) associated with them and typically do not have multiple associated sizes. Some keys (like name, size, and placement) may be defined by ad server 102. Ad server 102 may restrict the set of values for attributes defined by ad server 102. However, ad server 102 also allows publisher 106 to specify custom keys and arbitrary values for those keys.

In certain implementations, system 100 provides a user interface to publisher 106 to manage these ad slots within content provided by publisher 106. Based (at least in part) on input from publisher 106, ad server 102 can group ad slots by the characteristics of the network property in which the ad slots are included. These groups are typically referred to here as ad placements. Conceptually, a placement is normally a collection or bundle of one or more ad slots. In other words, it may be used as a shortcut for publishers 106 wanting to group ad slots together. If an ad slot belongs to a placement, one can think of the ad slot as having a "placement" attribute with that placement's name. Each ad slot can belong to multiple placements simultaneously. For example, a particular network property may target women between the ages of 20 and 30 having an educational level of a Masters degree. An ad slot contained in this example of a network property may be included in groups such as, a placement for women, a placement for people between the ages of 25 and 30, and/or a placement for people having an educational level of at least a high school diploma. In other words, the characteristics of placements may be used to satisfy targeting criteria of ad campaigns from advertisers 108.

An advertising program may include information concerning accounts, campaigns, creatives, targeting, etc. For example, the advertiser's account may relate to information for a given advertiser such as a unique e-mail address, a password, billing information, context information, and so forth. A "campaign" or "ad campaign" refers to one or more groups of one or more advertisements, and may include a start date, an end date, budget information, geographical targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information or restrictions (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. Specifically, targeting criteria (or restrictions) are used to identify the target audience for a particular ad campaign of advertiser 108. Examples of targeting criteria may include day, geography, language, behavioral segment, demographic group, frequency cap, domain, keyword, an ad slot attribute, system information, or any other suitable characteristic of the user or client 104. Typically, publisher 106 collects as much of this information as is known and relays the relevant information (or summary thereof) to ad server 102 to help satisfy the particular campaign. In certain situations, a campaign has flight dates and impression budget information associated with it. As stated, each ad group may have one or more ads or "creatives" (that is, ad content that is ultimately rendered to an end user).

Based on this information, ad server 102 may offer groups of placements to advertisers 108 as ad products. The ad product is a collection of targeting criteria, in the form of placements, that is offered to advertisers 108 by ad server 102. Additionally, the ad product also has pricing information (often a fixed cost per 1000 impressions, cost per click, or cost per action) associated with it. A restriction limits the allowed values of a particular attribute, such as sex, age, or education level. The possible range of values for an attribute is referred to as the domain of the attribute. The possible range of values allowed by the restriction is referred to as the domain of the restriction. Typically, an ad product is associated with a particular number of impressions. The number of impressions requested by advertiser 108 in an ad product is referred to as an impression reservation. Ad server 102 predicts the number of impressions users at clients 104 will generate during requests to view network properties of publishers 106. The predicted numbers of impressions for each ad slot are referred to as impression forecasts and may be based on a history of impressions.

System 100 often allows publishers 106 to manage product catalogs using an application 130. In some situations, application 130 provides a GUI to publishers 106 for managing product catalogs. For example, publisher 106 may add, modify, or remove ad slots from a product catalog using a web portal module of application 130. Application 130 also processes requests, for example, for impression availability queries. That is, application 130 compares the amount and type of forecasted impressions to the amount and type of reserved impressions. Ad server 102 may market surplus forecasted impressions of a particular type to advertisers 108. Ad server 102 may market surplus reserved or requested impressions of a particular type to publishers 106. Ad server 102 may also use impression amounts, referred to as capacities, allocated during the comparison as a plan when distributing network ads 140 to clients 104 presenting network properties. For example, ad server 102 may predetermine the order in which network ads will be distributed to ad slots, based on factors, such as the forecasted impressions, the reserved impressions, costs paid by advertisers 108 for reserved impressions, and penalties paid to advertisers 108 for not providing the number of reserved impressions. Similarly, advertisers 108 may directly, or indirectly, enter, maintain, and track ad information in ad server 102.

Turning to the illustrated components, ad server 102 may be any business, entity, or computer that helps manage ad inventory, at least partially generated by advertisers 108, for the use by publishers 106. For example, illustrated ad server 102 comprises an electronic computing device operable to receive, transmit, process and store data associated with system 100. Each computer is generally intended to encompass any suitable processing device. System 100 can be implemented using computers other than servers, as well as a server pool. Indeed, ad server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Ad server 102 may be adapted to execute any suitable operating system including Linux, UNIX, Windows Server, or any other suitable operating system. In certain implementations, ad server 102 may also include or be communicably coupled with a web server and/or a mail server.

Ad server 102 includes memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. While memory 120 may be local, it may also be any intra-enterprise, inter-enterprise, regional, nationwide, or global electronic storage facility, data processing center, or archive that allows for one or a plurality of clients 104 (as well as advertisers 108 and publishers 106) to dynamically store and retrieve data, which may include network ads 140. Memory 120 may also store or reference any other appropriate data such as multivalue decision diagrams (MDDs), flight plans, virtual private network (VPN) applications or services, firewall policies, a security or access log, print or other reporting files, HTML files or templates, media, data classes or object interfaces, child software applications or sub-systems, billing records, and others. Memory 120 may be physically or logically located at any appropriate location including in one of the example enterprises or off-shore, so long as it remains operable to store network ads 140 associated with system 100 and communicate such ads 140 to at least one publisher 106, which may then present the ads 140 to one or more clients 104.

Network ads 140 include any parameters, pointers, variables, algorithms, instructions, rules, files, links, or other data for easily providing secondary content for any combination of user context and application data at any appropriate level of granularity. It will be understood that while user context may be described in terms of "combinations," such various user context data may be stored or processed using at least one data structure, object, record or file. Such network ads 140 may include (among other things) primary content, secondary content, and/or sponsored content. For example, each network ad 140 may be a text element, a graphics element, a multimedia element, a network link to a second application, a network link to a remote module, an executable, or any other graphical or display element. In a more specific example, network ad 140 may include or reference a publicly-available web page (or portion thereof), an internal e-mail, the user's personal contact information, weather information, a profit and loss report of a company, an OLAP (on-line analytical processing) report, portion of a sales order, as well as many others. In certain implementations, network ads 140 (or pointers thereto) may be stored in one or more tables in a relational database described in terms of SQL statements or scripts. In certain implementations, network ads 140 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular network ad 140 record may merely be a pointer to a third party ad stored remotely. In another example, a particular network ad 140 may be an internally stored advertisement for a tightly coupled service. In short, network ads 140 may comprise one table or file or a plurality of tables or files stored on one computer or across a plurality of computers in any appropriate format. Indeed, some or all of network ads 140 may be local or remote without departing from the scope of this disclosure and store any type of appropriate data.

As described in more detail in later figures, these network ads 140, and placements, may be stored or logically associated as a product catalog that can be sold or queried for availability. More specifically, this product catalog may be a product catalog graph that can serve as a template for a reserved inventory graph. In some cases, these two graphs can be thought of as two layers in one graph. In these cases, the reserved inventory graph may include sub-placements and sub-slots that are linked to their parent placements and slots in the product catalog graph. The sub-placement exists for every sold placement and may include restrictions, as well as placement information.

In some implementations, product catalogs may benefit the particular publisher 106 because the catalogs may help organize the network ads 140 so that sales people can more easily sell the inventory. For example, there may be a menu of ad products for sales people to choose from so that they do not have to create their products on the fly as they sell impressions, thereby potentially reducing the complexity of the sales process. The product catalogs may also help sales management control what can be sold and at what price, as well as to communicate with the backend server calculations so that the backend server can more accurately and efficiently serve the publisher 106. For example, if the sales manager removes two ad slots from an ad product, the backend servers will immediately reduce the forecast and availability numbers for that ad product. Publishers 106 may more efficiently sell a larger percentage of the available inventory using product catalogs. Further, product catalogs may help support or facilitate publishers 106 in improving their yield management because they can quickly and easily adjust ad product definitions which take effect immediately. In fact, this adjustment can normally occur without modifying their web pages or property.

On the ad server 102 side, the product catalog may provide a way for the sales management to communicate with the backend servers logic to provide a "heads up" for product catalog structure changes. In other words, this may allow backend servers to provide more accurate results of ad inventory. The product catalog may also allow the ad servers to organize the sold inventory using the product catalog as a template. This may reduce the computation required when an advertiser buys an ad product with additional target criteria. Using the product catalog information, these ad service and inventory management servers can know which subset of the inventory graph should be updated without having to reconstruct the entire graph. Using product catalog knowledge, application 130 can also precalculate some time-consuming calculations and cache the results, providing faster response time for publishers.

These same data structures (or logical representations) may be used to create flight plans for ad delivery. The flight plans would have per-slot information: how many impressions to serve for each ad for the time period (i.e., a day, an hour, and so on). In certain cases, the flight plans can be created offline prior to ad delivery, thereby potentially making ad delivery simpler and cheaper. For example, these flight plans may be generated and published daily to help maximize revenue.

Ad server 102 also includes processor 125. Processor 125 executes instructions and manipulates data to perform the operations of ad server 102 such as, for example, a central processing unit (CPU), a blade, an application specific integrated circuit (ASIC), or a field-programmable gate array (FPGA). Although FIG. 1 illustrates a single processor 125 in ad server 102, multiple processors 125 may be used according to particular needs and reference to processor 125 is meant to include multiple processors 125 where applicable. In the illustrated implementation, processor 125 executes application 130.

At a high level, the application 130 is operable to receive and/or process requests from users and present at least a subset of the results to the particular user via an interface. More specifically, application 130 is any application, program, module, process, or other software that can help identify the context of the user (or receive it from the publisher 106) and that communicates relevant network ads 140 along with other data though GUI 136 according to dynamic criteria and the precomputed flight plans. Application 130 may deliver relevant text and image ads that are precisely targeted to the publisher's site and site content. Application 130 may include various filters to help ensure that appropriate or targeted ads 140 are delivered to publishers 106. For example, a competitive filter may help filter out specific competitors or specific advertisers 108 for publisher 106. In another example, a contextual filter may help eliminate delivery of ads that would be inappropriate to serve on the particular pages. More specifically, using sensitive language filters, publisher 106 input, and a team of linguists may enable application 130 to automatically filter out ads that may be inappropriate for the publisher's content. In this manner, application 130 may offer advertisers a wide range of product offerings from personalized ads (text ads and banner ads) to contextual ads based on user and business context. Moreover, application 130 may monitor how many users or businesses select each of the ads and then record what each person does at the website, thereby helping refine context and the relevance (and placement) of each of the ads while weeding out the less effective efforts. Applicant 130 may also (either alternatively or in combination) provide a front-end to publishers 106 to help them increase advertising revenue from their properties. The front-end or publisher portal may allow the publisher 106 to more effectively manage and search its accounts and billing records and available inventory, as well as performing forecasting and other analysis. In certain cases, this publisher portal may be quite decoupled from the ad service functionality. Indeed, application 130 may further have an advertiser portal that allows various (perhaps authenticated) advertisers 106 to manage their particular inventory and accounts.

Regardless of the particular implementation, "software" may include software, firmware, wired or programmed hardware, or any combination thereof as appropriate. Indeed, application 130 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), or Microsoft's .NET. It will be understood that application 130 may include numerous other sub-modules or may instead be a single multi-tasked module that implements the various features and functionality through various objects, methods, or other processes. Further, while illustrated as internal to ad server 102, one or more processes associated with application 130 may be stored, referenced, or executed remotely. For example, a portion of application 130 may be a web service that is remotely called, while another portion of application 130 may be an interface object bundled for processing at client 104. In another example, some of the processes or modules may reside—or distributed processing take place—on client 104, publisher 106, or advertiser 108 as appropriate. Moreover, application 130 may be a child or sub-module of another software module or marketing application (not illustrated) without departing from the scope of this disclosure.

Ad server 102 may also include interface 117 for communicating with other computer systems, such as clients 104 or publisher 106, over network 112 in a client-server or other distributed environment. In certain implementations, ad server 102 receives data from internal or external senders through interface 117 for storage in local memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between ad server 102 and any other local or remote computer, such as clients 104. Network 112 may be all or a portion of an enterprise or secured network. In another example, network 112 may be a VPN merely between ad server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between ad server 102 and at least one client 104. For example, ad server 102 may be communicably coupled to a repository through one sub-net while communicably coupled to a particular client 104 through another. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain implementations, network 112 may be a secure network associated with the enterprise and certain local or clients 104.

Client 104 is any computing device operable to connect or communicate with ad server 102 or network 112 using any communication link. At a high level, each client 104 includes or executes at least GUI 136 and comprises an electronic computing device operable to receive, transmit, process and store any appropriate data associated with system 100. It will be understood that there may be any number of clients 104 communicably coupled to ad server 102. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers.

As used in this disclosure, client 104 is any person, department, organization, small business, enterprise, or any other entity that may use or request others to use system 100, namely application 130. Client 104 is intended to encompass a personal computer, touch screen terminal, workstation, network computer, kiosk, wireless data port, smart phone, personal data assistant (PDA), one or more processors within these or other devices, or any other suitable processing device used by a user viewing a network property of publisher 106. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of ad server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. GUI 136 may comprise a plurality of customizable frames or views having interactive fields, pull-down lists, and buttons operated by the user. For example, GUI 136 is operable to display certain network ads 140 in a user-friendly form based on the user context and the displayed data. GUI 136 may also present a plurality of portals or dashboards. GUI 136 is often configurable, supporting a combination of tables and graphs (bar, line, pie, status dials, etc.), and is able to build real-time dashboards, where network ads 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 136 may indicate a reference to the front-end or a component of application 130, as well as the particular interface accessible via client 104, as appropriate, without departing from the scope of this disclosure. Therefore, GUI 136 contemplates any graphical user interface, such as a generic web browser or touch screen, that processes information in system 100 and efficiently presents the results to the user. Ad server 102 can accept data from client 104 via the web browser (e.g., Microsoft Internet Explorer or Netscape Navigator) and return the appropriate HTML or XML responses to the browser using network 112.

In one aspect of operation, by supporting a product catalog on the ad server side, publishers can create and manage their ad product inventory using an application or web application, without modifying their web pages. In this case, ad server 102 may take advantage of this product catalog structure to reduce the complexity of the calculations to support ad management processes (calculating number of impressions that are available for a particular ad product with specific targeting criteria; and given the latest forecasts, which line-items are at risk of meeting their goals). In addition, the backend servers can use the product catalog knowledge to precalculate some time-consuming calculations, providing faster response to publisher's queries. With respect to the publishers (such as when they modify or are considering modifying their product catalog), the server-side implementation can more easily answer questions like: i) if it removes this ad slot, what line-items are adversely impacted? ii) how many impressions are available for ad product <x> after reconfiguring ad product <x>? iii) given the latest forecast for ad slots, which line-items are at risk of not meeting their goals?

In another example aspect of operation, the process for handling ad requests should normally be as fast and cheap as possible. Precomputing flight plans ahead of ad delivery time may reduce the calculations that need to be performed for each single ad request, as well as tremendously reducing the number of calculations that must be performed. If availability calculations are returning optimum results, it is possible for availability calculations to be more accurate than ad delivery results. With this in mind, ad server 102 may implement or execute algorithms to calculate availability along assigned priorities/costs (as well as a smoothing algorithm) to create flight plans that are consistent with the results from the availability queries. Generally, flight plans are detailed instructions for each ad slot to the ad serving software that specify the priority of each qualified ad to serve to that ad slot. In some implementations, flight plans are computed offline before ad delivery time. Such precomputed flight plans may help make the ad delivery process simple, fast, highly scalable, and cheap.

In another aspect of operation, system 100 may support any arbitrary Boolean combination of ad targeting criteria, such as:

(((Language=French) OR (Country=Canada)) AND (Gender=female)) OR (Language=French) AND ((Country=USA) OR (Gender=male)))

For example, ad server 102 can support these arbitrary Boolean combinations using MDDs. Ad server 102 can also maintain an MDD bank for reusing MDD graphs and subgraphs. This MDD bank, which would typically reside in or be coupled with memory 120, shares MDDs across the ad serving enterprise, product catalog graphs, and even across publishers.

In a further aspect of operation, ad server 102 may perform a select number of iterations in response to availability queries. For example, when publishers' sales people are looking for inventory that meets an advertiser's requirements or requests, publisher 106 may perform many availability queries, each of which may utilize relatively substantial resources by ad server 102. To help reduce the time and resources consumed by these queries, ad server 102 might then perform that select number of iterations (i.e., a predetermined number or percentage of the availability queries presented) to provide limited pre-computation. In some cases, application 130 can perform experiments to determine a desired (e.g., ideal) number of iterations to perform for each publisher's product catalog. For example, when performing the limited availability calculations, the ad provider can stop after performing that number of iterations and return the result accumulated so far.

In yet another aspect of operation, ad targeting restrictions may allow multiple values for one or more criteria. Although the total number of values that a criteria can take may be large, the combinations in which these values occur in the restrictions may be small. Then, application 130 may consider certain sets rather than all of the individual values. These sets are often referred to as Attribute Domain Partitions (ADPs). Sets that involve multiple criteria types are often termed as Restriction Domain Partitions (RDPs). Ad server 102 may perform availability calculations so that sales people can determine how many impressions they can sell. Often targeting criteria is attached to sold reservations and to the availability queries. To perform these availability calculations, application 130 normally first decomposes the ad targeting criteria space into disjoint pieces. Minimizing the number of disjoint pieces may reduce the complexity of the availability calculations so that the calculations can often be performed faster.

Figure 2:
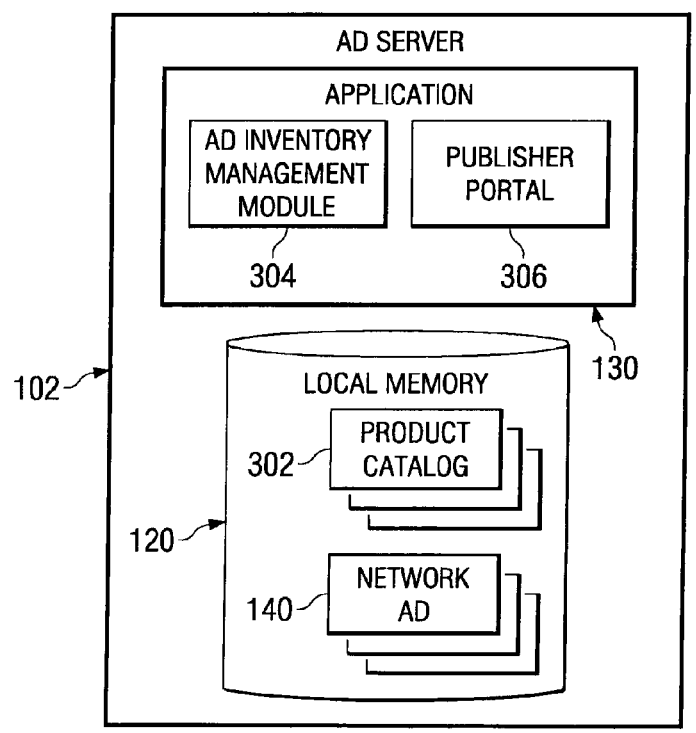
FIG. 2 is a block diagram showing an example of an ad server for managing network ad inventory.

FIG. 2 is a block diagram showing an example of ad server 102 for managing network ad inventory. Ad server 102 includes or is coupled with memory 120 that stores network ads 140 from advertisers 108, such as the pet food, dog grooming, and pet kenneling ads for use in GUI 136. In addition, memory 120 may store product catalogs 302 associated with publishers 106. Product catalogs 302 may include a product catalog identifier (ID), placement IDs, and ad slot IDs. Product catalogs 302 may be referenced by product catalog IDs. Each product catalog 302 includes one or more placements, referenced by placement IDs, that group one or more ad slots, referenced by ad slot IDs. Product catalogs 302 include information, such as keywords or categories associated with an ad slot or network property. For example, the ad slots 202*a-c* may have associated keywords or categories of "pet" and "dog." Application 130 includes an ad inventory module 304 that assigns network ads 140 to ad slots based on the forecasts and reservations previously described. Application 130 also includes a publisher portal 306 that provides a user interface for publishers 106 to manage product catalogs 302. In one implementation, publisher portal 306 restricts access to product catalogs 302 to authorized users.

Figure 3:
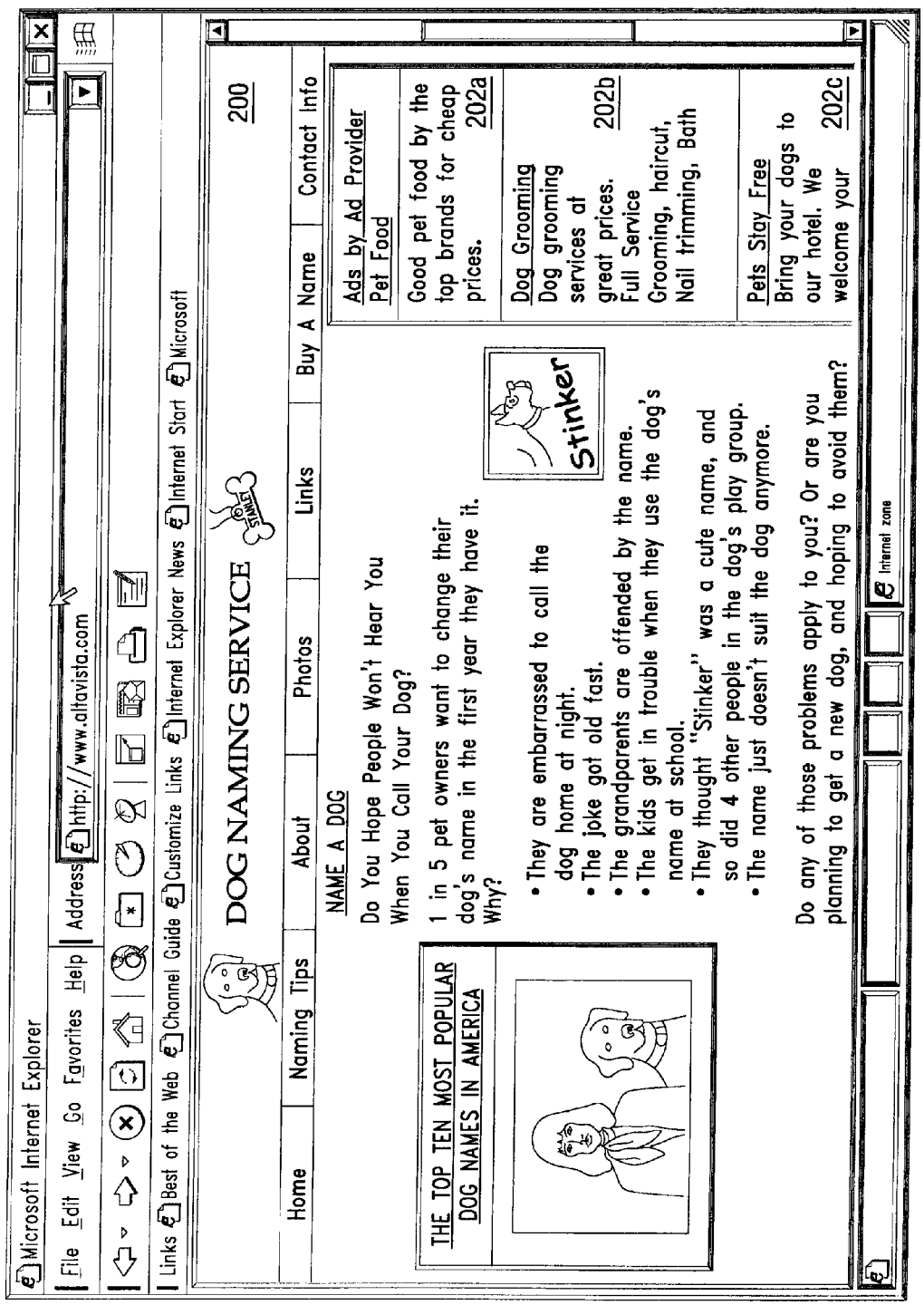
FIG. 3 is an example of a graphical user interface for a publisher network property that includes ad slots.

FIG. 3 is an example of a graphical user interface 200 for a publisher network property that includes ad slots 202*a-c*. In this example, the publisher network property is a webpage for a dog naming service. The network property may be identified as being associated with pets, and in particular, dogs. Advertisers 108, such as a pet food vendor, a dog grooming service, and a pet kenneling service, may purchase ad products that include placements having conditions such as a pet's restriction and a dog's restriction, respectively. Advertisers 108 may have a particular number of reserved impressions for the pet, dog, and pet placements, respectively. For example, the dog groomer may have a contract for 1000 impressions each day, while the kennel service and the pet food vendor may reserve 100 impressions per day. Application 130 allocates impressions in ad slots 202*a-c* to each of the network ads from advertisers 108 included in the ad products. Application 130 may base the allocation on a previously calculated distribution of impressions using the impression reservations from the ad products and the forecasted impressions from the product catalogs of publishers 106. Application 130 may also base the previously calculated impression distribution on the penalties ad server 102 pays to advertisers 108 for an impression shortfall and costs received from advertisers 108 for meeting an impression reservation. For example, if a forecast does not include enough impressions to meet all of the impression's reservations, then application 130 may compare a cost from meeting one reservation to a cost plus a penalty for not meeting another to determine which reservation receives an impression shortfall.

Figure 4:
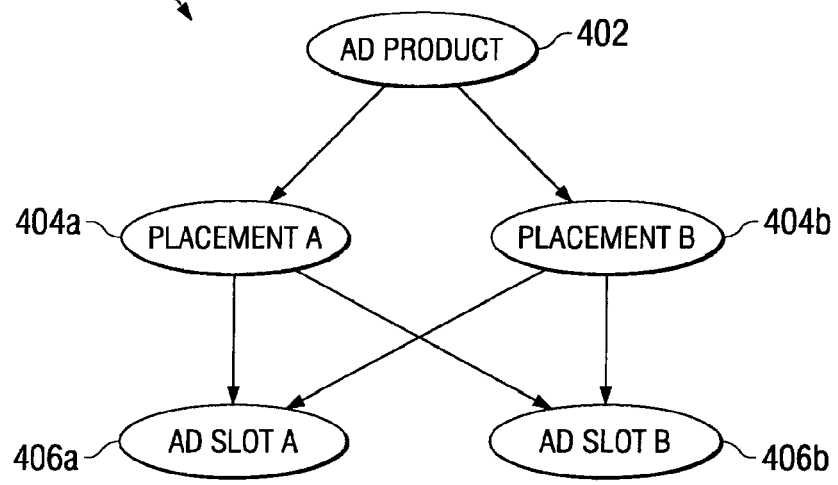
FIG. 4 is an example of a multi-tier directed graph of a product catalog.

FIG. 4 is an example of a multi-tier directed graph 400 of a product catalog. A product catalog graph can be created for each network property. Multi-tier directed graph 400 shows the hierarchical relationships between the elements of the product catalog. The first tier includes ad products, such as ad product 402. The second tier contains placements 404*a-b* included in ad product 402. In general, there may be one or more ad products in graph 400 and a particular placement may belong to one or more ad products. In certain implementations, a placement may be included in another placement and/or an ad product may be included in another ad product, thus allowing nested elements within a tier. The third tier contains ad slots 406*a-b*. Each ad slot 406*a-b* belongs to one or more placements 404*a-b*.

Figure 5:
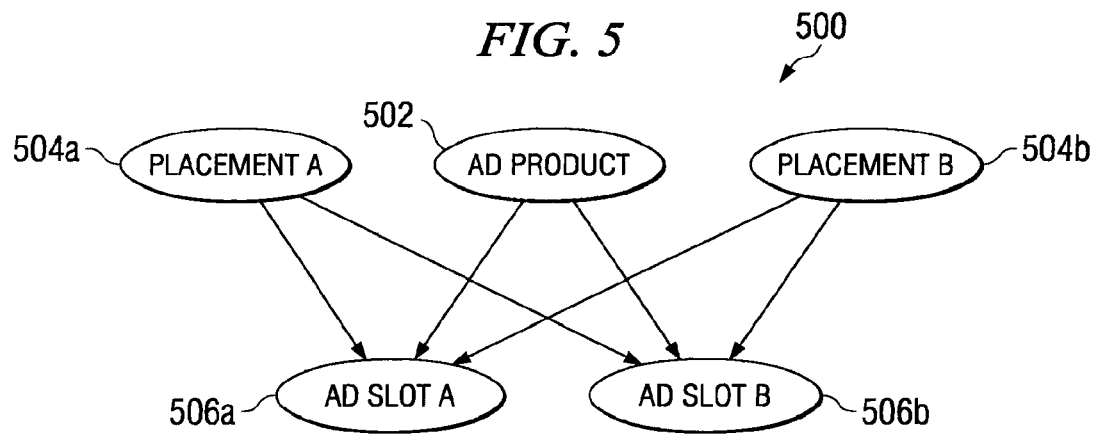
FIG. 5 is an example of a flattened multi-tier graph of a product catalog.

FIG. 5 is an example of a flattened multi-tier graph 500 of a product catalog. The information in product catalog graph 400 is used as a template for creating a reserved impression inventory graph. The flattened graph 500 is an intermediate step in creating the reserved impression inventory graph. The flattened graph 500 includes ad product 502 and placements 504*a-b* in a first tier. Ad slots 506*a-b* are included in a second tier. Placements 504*a-b* no longer show a hierarchical relationship with ad product 502.

Figure 6:
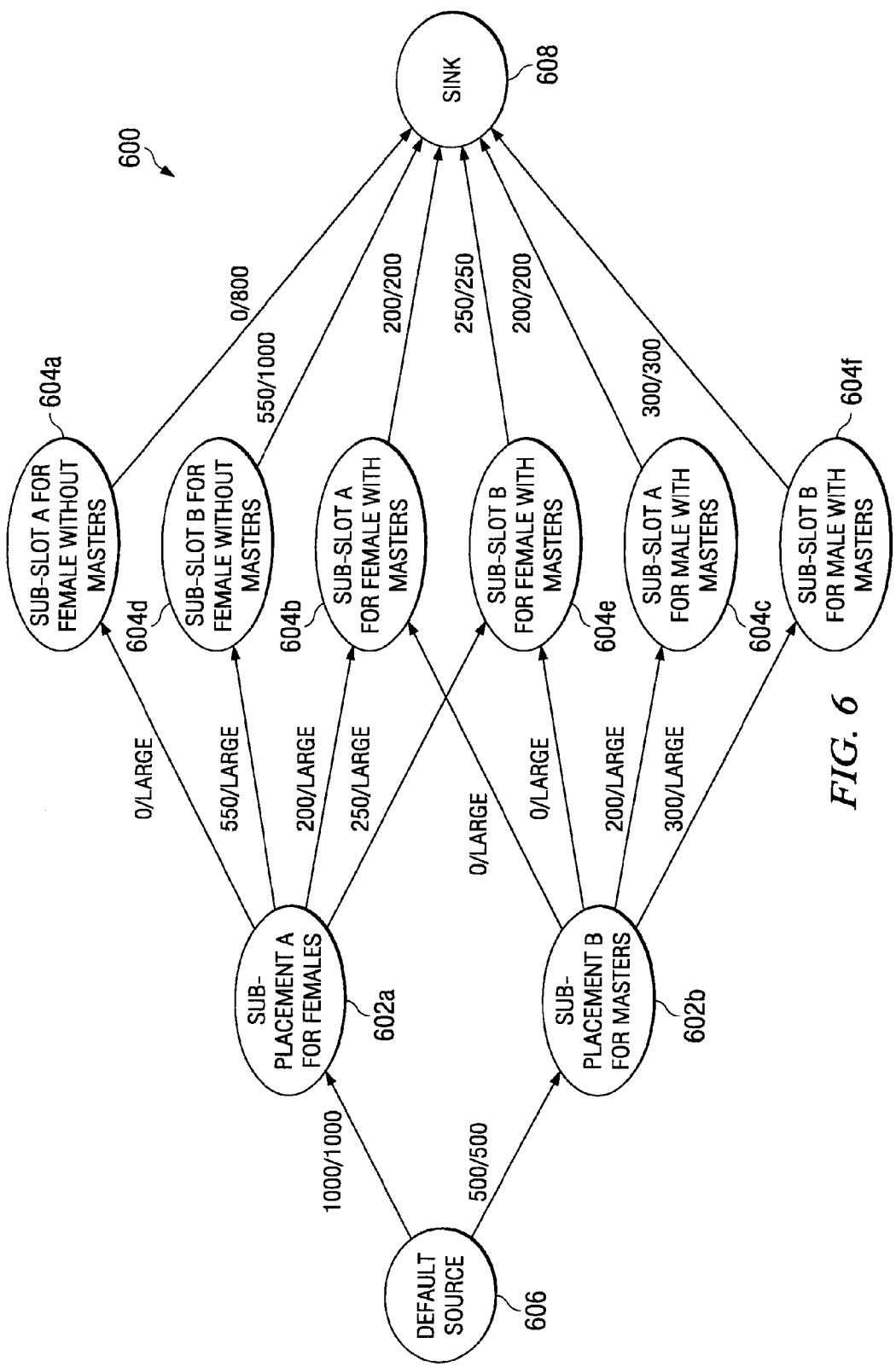
FIG. 6 is an example of a second-level multi-tier directed graph associated with a product catalog.

FIG. 6 is an example of a second-level multi-tier directed graph 600 associated with a product catalog. Graph 600 represents a reserved impression inventory. Placement 504*a* has a corresponding sub-placement 602*a*, placement 504*b* has a corresponding sub-placement 602*b*, ad slot 506*a* has corresponding sub-slots 604*a-c*, and ad slot 506*b* has corresponding sub-slots 604*d-f*, in graph 600. Sub-placement 602*a* includes a restriction for impressions presented to females. Sub-placement 602*b* includes a restriction for impressions presented to individuals with a masters degree level of education. Ad slots 506*a-b* both contain forecasted amounts of impressions meeting the restrictions. The types of impressions are separated into sub-slots 604*a-f*. Three types of impressions satisfy the restrictions of one or both sub-placements 602*a-b*, particularly, females with masters degrees, females without masters degrees, and males with masters degrees. Other types of forecasted impressions may exist for ad slots 506*a-b*, but are not shown here if they do not satisfy the restrictions. Sub-slots 604*a-f* form a domain of impression types for ad slots 506*a-b* that satisfy the restrictions in sub-placements 602*a-b*.

Application 130 may use graph 600 to create a flight plan by executing various algorithms that calculate availability along assigned priorities/costs and a smoothing algorithm. Such algorithms may create flight plans that are consistent with the results from the availability queries. For example, graph 600 may be subjected to a max-flow calculation based on the forecasted impressions for each sub-slot 604*a-f* and the reserved impressions for each sub-placement 602*a-b*. Given graph 600, where each edge between nodes has a capacity, the max-flow calculation finds a maximal flow from a source 606 to a sink 608, subject to the reservation and forecast impression constraints. The max-flow algorithms may implement or represent any appropriate technique or calculations including a brute-force search through all possible impression allocations, linear programming, the Ford-Fulkerson algorithm, the Edmonds-Karp algorithm, and the relabel-to-front algorithm. In general, the max-flow calculation is iterated to find an assumed optimal solution to the distribution of forecasted impressions across sub-slots 604*a-f* and correspondingly ad slots 506*a-b*.

Edges between sub-slots 604*a-f* and sink 608 are initialized to the forecasted number of impressions for the associated ad slot and impression type. Particularly, the forecasts are 800 for sub-slot 604*a*, 1000 for sub-slot 604*d*, 200 for sub-slot 604*b*, 250 for sub-slot 604*e*, 200 for sub-slot 604*c*, and 300 for sub-slot 604*f*. Edges between source 606 and sub-placements 602*a-b* are initialized to the number of reserved impressions for the sub-placement. Particularly, the reservations are 1000 for sub-placement 602*a* and 500 for sub-placement 602*b*. Edges between sub-placements 602*a-b* and sub-slots 604*a-f* are initialized to a number that is very large relative to the forecasts and reservations.

Iterations of the max-flow calculation may be performed to determine optimal values for the capacity of each edge in graph 600. In this example, there are not enough reserved impressions to meet the forecasted number of impressions. Accordingly, forecasts for sub-slots 604*c* and 604*f* are met using reservations from sub-placement 602*b* and forecasts for sub-slots 604*b* and 604*e* are met using reservations from sub-placement 602*a* (e.g., calculated capacity equals the forecast). Forecasts for sub-slot 604*d* are partially met by sub-placement 602*a* (e.g., capacity equals the remainder of the reservations 550), while forecasts for sub-slot 604*a* are not used (e.g., capacity is zero). In other words, this example graph 600 may leave some forecasted impressions unused by advertisers 108 and an availability query may be performed to determine the amount of unused forecasted impressions.

Figure 7:
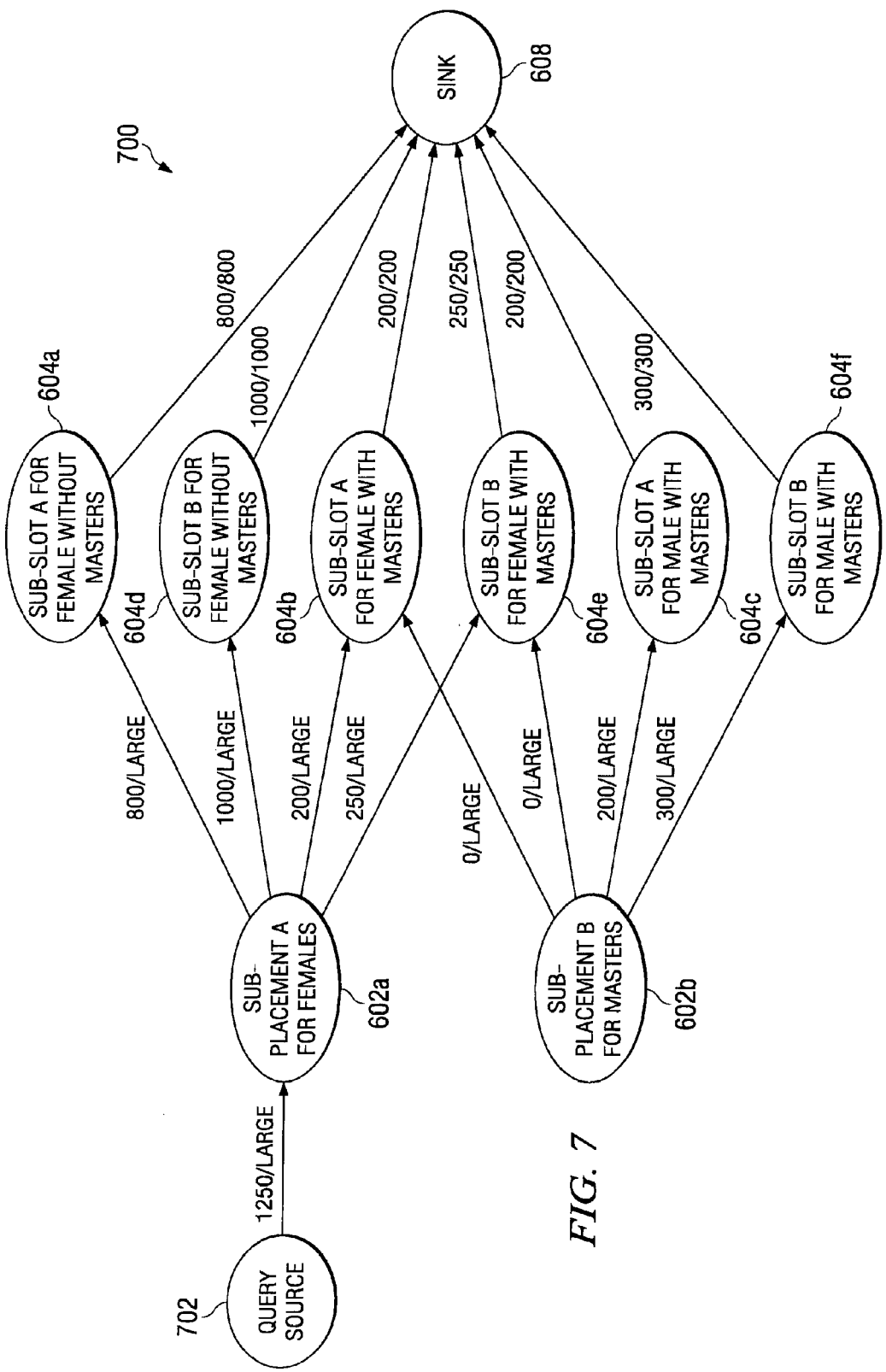
FIG. 7 is an example of a second-level multi-tier directed graph including an availability query.

FIG. 7 is an example of a second-level multi-tier directed graph 700 subjected to an availability query. Illustrated graph 700 replaces default source 606 with query source 702. Query source 702 represents a query for available forecasted impressions from sub-placement 602*a*. Capacities of existing edges remain at the values calculated for graph 600. The new edge between query source 702 and sub-placement 602*a* is initialized to a number that is very large relative to the values of the other edges. This provides a temporary surplus of reserved impressions for the query calculation that absorbs all available forecasted impressions below sub-placement 602*a*. Iterations of the max-flow calculation are performed to determine the number of available forecasted impressions in sub-placement 602*a*.

In some situations, the iterations are performed until a predetermined, dynamically determined, or other optimal value is reached for the availability. In certain implementations, availability is provided before the optimal number of iterations are performed, such as after a threshold number of iterations are performed or the availability changes by less than a threshold amount after a particular iteration. Providing availability before the optimal iteration is reached decreases the amount of time needed to perform the operation before seeing a result. In certain implementations, one or more availabilities are provided before the optimal iteration as well as providing the availability at the optimal iteration. Sub-placements 602*a-b* may also include prices paid by advertisers 108 for the impression reservations and penalties potentially paid by ad server 102 should a reservation not be met. In the case where the number of reservations for one or more sub-placements is larger than the number of forecasted impressions for sub-slots below the sub-placements, then the prices and penalties may be used to determine the reservation with the least impact to ad server 102. For example, when choosing between two reservations, the price paid to ad server 102 by an advertiser can be compared to the price lost from another ad server plus the penalty paid to the other advertiser, and vice versa, to determine which advertiser is given an impression shortfall.

In certain implementations, such as when distributing network ad impressions to ad slots in real-time using previously calculated max-flow capacities, impressions may be distributed over the range of a restriction. For example, if a particular restriction has a range of 20-30 in the domain of user ages, advertisers 108 may request that the impressions be distributed across the range of ages with no over concentration in a particular age. This is accomplished by adding a tier of nodes between sub-placements (such as illustrated sub-placements 602*a-b* and sub-slots 604*a-f*). For example, if the restriction for sub-placement 602*b* was instead bachelors or masters degrees and an even distribution was requested of the range of accepted education levels, then two nodes are added for each of the sub-slots 604*b*, 604*c*, 604*e*, and 604*f* between the sub-slots and sub-placement 602*b*, one new node for bachelors degrees and one new node for masters degrees. The forecast impressions for each sub-slot are then divided evenly among the two new nodes associated with the sub-slot. Alternatively, an intentional bias may be introduced by unevenly dividing the forecast impressions among the new nodes of a sub-slot. In general, extra forecast impressions may be added to the new slots to provide for an approximately even division of impressions between the new nodes (e.g., a slack factor), while the total forecast of the sub-slot remains unchanged.

In certain implementations, the status of an impression reservation may be considered when assigning network ads to ad slots. For example, an impression reservation may be final (e.g., purchased), proposed, or bid on. In this example, purchased impressions are settled before bids or proposed reservations, then reservations having a highest bid in an impression auction, and finally proposed reservations are assigned impressions.

Regardless of the particular hardware or software architecture used, application 130 (and the various example components, whether internal, linked, or distributed) is generally capable of managing, which includes forecasting, network ad inventory as appropriate and executing various other related network ad processes and techniques. Some of these processes are illustrated in certain flowcharts described below. For example, FIGS. 8, 9, 13, 14, and 15 are flow charts showing methods 800, 816, 1300, 1400, and 1404, respectively. These techniques may be performed, for example, by any suitable system and, for clarity of presentation, the following description uses system 100 (and application 130) as the basis of examples for describing these processes 800, 816, 1300, 1400, and 1404. But system 100 contemplates using any appropriate combination and arrangement of software elements implementing some or all of the described functionality.

FIG. 8 is a flow chart showing an example of method 800 for managing network ad inventory. For example, publisher 106 may add, remove, or modify ad slots contained in a product catalog at ad server 102. The method 800 begins, at step 802, with receiving an ad inventory request (e.g., from a publisher). For example, publisher 106 may make an availability query request using publisher portal 306. Publisher 106 may be determining where to create ad slots in a collection of network properties. In addition, an advertiser 108 may make a reservation request or cancel a reservation request.

At step 804, a product catalog associated with the request is identified. For example, ad inventory management module 304 may locate product catalog 302 associated with publisher 106. At step 806, product catalog information about a network property is collected. For example, ad inventory management module 304 may collect product catalog 302 as well as information regarding placements and ad slots in product catalog 302.

At step 808, a first-level multi-tier directed graph is generated based on the collected product catalog information. For example, ad inventory management module 304 may generate a three-tier directed graph 500 representing product catalog 302. At step 810, the multi-tier directed graph is flattened. For example, ad inventory management module 304 may flatten the three-tier directed graph 500 into the two-tier directed graph 600.

At step 812, another multi-tier (e.g., second level) directed graph based on the flattened multi-tier directed graph is generated. For example, ad inventory management module 304 may generate the multi-tier directed graph 700, representing the reserved impression inventory, based on the two-tier flattened directed graph 600. At step 814, capacities of the another (e.g., second tier) multi-tier directed graph is initialized. For example, ad inventory management module 304 may initialize the edges between nodes of the multi-tier directed graph 700, such as that described with respect to FIG. 7. At step 816, the request is processed.

More specifically, once the inventory graph has been generated, application 130 may allow various operations to be performed on this graph, often more quickly and accurately. For example, application 130 may allow publisher 106 to easily add or delete reservations. To incrementally add a reservation to the inventory graph, application 130 may create a new sub-placement node. If there are no pre-existing reservations for a sub-placement, then application 130 creates a new node. Application 130 then connects the new sub-placement to the original source node used to initialize the graph and sets the capacity on the edge between the source node and the new placement node to the number of impressions being reserved. When appropriate, application 130 recomputes RDPs for the sub-placement and creates new sub-slots. Application 130 can then set the capacity to infinity on the edges between any new sub-slot nodes and the sub-placement being queried. Application 130 can then execute the max-flow algorithm or other availability process on the new source node. Similarly, when a reservation is deleted, sub-placements and sub-slots are deleted and the same or similar steps are performed to back out availability calculations.

Application 130 may also modify the product catalog. In this case, application 130 can add a new placement or ad product by updating the first layer (i.e., the product catalog layer). To remove an ad slot, application 130 may first move the assignments for the sub-slots belonging to the ad slot elsewhere using any suitable method. To add a new slot that has a forecast, application 130 can create new sub-slot nodes for placements that include that particular ad slot. Application 130 may assign zero impressions to the edges between the sub-placements and these new ad slots.

In another example, publisher 106 may execute an availability query via the publisher portal as described in more detail in FIG. 9. In this example, application 130 may calculate the availability for a sub-placement by first creating a new sub-placement node if desired. If there are no pre-existing reservations for a sub-placement, then a new node may be created. Application 130 then recomputes RDPs for the sub-placement and creates new sub-slots. At this point, application 130 can simply transfer the assignments to the new sub-slots without rerunning the max-flow algorithm. If new nodes (either a sub-placement or a sub-slot node) were added, application 130 sets the capacity of the edge nodes between the sub-placement and its sub-slots to infinity. Application 130 then adds a new source node to the graph which only connects to the sub-placement being queried and sets the capacity on the edge between the new source node and sub-placement being queried to infinity so that it will absorb all of the available impressions. Application 130 can then execute the max-flow algorithm or another availability process on the new source node. The assignment on the edge between the new source node and the sub-placement being queried would then be the availability result.

In this example, ad server 102 may process a request from advertiser 108 or a sales person of ad server 102 for an available number of impressions for a particular placement. Method 816 begins, at step 902, with performing an iteration of a max-flow calculation. For example, ad inventory management module 304 may perform an iteration of a max-flow calculation to determine capacities along edges in graph 700 for an availability query.

If, at step 904, a threshold is reached, then method 816 provides, at step 906, a max-flow calculation value at the threshold iteration. If the threshold has not been reached, then process 816 performs another iteration at step 902. For example, ad inventory management module 304 may perform a predetermined number of iterations before reporting a calculation value to publisher 106 via publisher portal 306.

At step 908, method 816 performs another iteration of the max-flow calculation. If, at decisional step 910, an optimum iteration has been reached, then method 816 provides, at step 912, a calculation value at the optimum iteration to the publisher. For example, after determining an optimal value for the impression availability, ad inventory management module 304 provides the value to publisher 106 via publisher portal 306. In one implementation of step 910, a check can be performed to determine if a predetermined iteration level has been reached. For example, a check can be made to determine an improvement over a previous iteration and if insufficient delta is found, the process may stop. In another implementation, a threshold test can be applied.

Often, when performing an availability query, it is not necessary to distinguish between advertisers or line items that have the same restrictions. However, in some implementations, each sub-placement node will store the line-items that map to that node so ad server 102 can easily determine competing line-items. For availability queries with day-parting restrictions, the user timezone calculations may cause ad server 102 to lose some part the impressions for a day. Therefore, ad server 102 can subtract a day when calculating availability queries for day-parting restrictions. Also, ad server 102 may look at the start time and end time rather than just the start day and end day to see whether to deduct impressions.

In certain situations, application 130 may then "undo" the availability results in the graph after it returns the availability result. In one implementation, application 130 may first back out the assignment for the sub-placement by looping through the edge nodes between the sub-placement and its sub-slots and decrementing the assignment in any way. Application 130 may then back out the sub-placement node if it was newly created for the availability query, as well as back out the sub-slot(s) node if it was newly created for the availability query.

Figure 10:
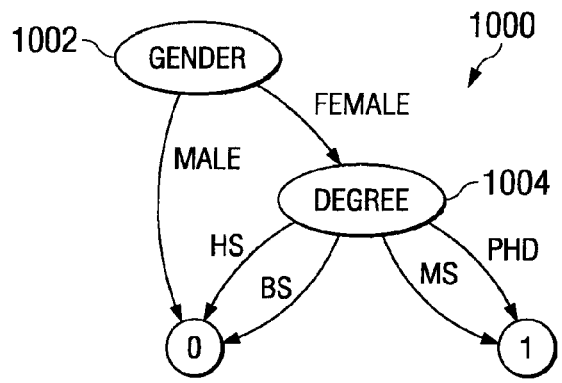
FIG. 10 is an example of a multi-value decision diagram (MDD) that represents a Boolean-valued function (BVF)

FIG. 10 is an example of a multi-value decision diagram (MDD) 1000 that represents a Boolean-valued function (BVF). Restrictions in placements may be expressed as a BVF. For example, a restriction described as females having a masters degree (MS) or a Doctor of Philosophy (PHD) may be expressed as the following BVF:

(gender==female) & ((degree==MS)|(degree==PHD))

Where | denotes a logical "or" and & denotes a logical "and." The domain of the BVF above may be shown in a table as the Cartesian product of the domains of gender and degree, such as in the following table:

| Gender | Degree | Value |
|--------|--------|-------|
| male   | HS     | False |
| male   | BS     | False |
| male   | MS     | False |
| male   | PHD    | False |
| female | HS     | False |
| female | BS     | False |
| female | MS     | True  |
| female | PHD    | True  |

Where HS indicates a high school diploma and BS indicates a bachelors degree. Every potential value of the restrictions is listed in the table above. The BVF and the Cartesian product in the table above may be represented by MDD 1000. MDD 1000 includes a gender restriction 1002 and a degree restriction 1004. Edges of MDD 1000 represent values of the restricted attributes, such as male, female, hs, bs, ms, and phd. MDD 1000 shows that the female edge together with either the ms edge or the phd edge satisfy the restrictions in the BVF above. Once created, MDD 1000 may be stored in local memory 120 and reused in a subsequent BVF.

Figure 11:
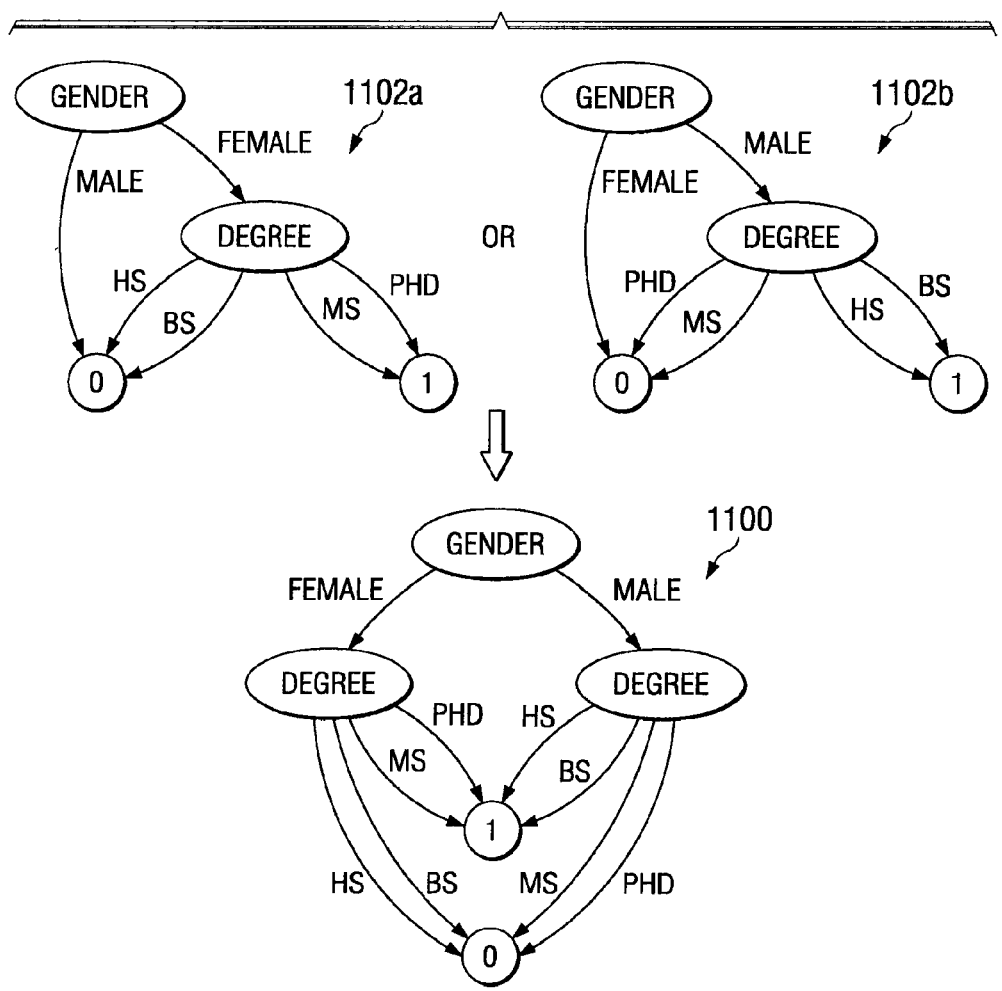
FIG. 11 is an example of forming an MDD from stored MDDs.

FIG. 11 is an example showing the formation of an MDD 1100 from stored MDDs 1102a-b. For example, the following two BVFs may be combined using an OR operator:

(gender==female) & ((degree==MS)|(degree==PHD))
OR
(gender==male) & ((degree==HS)|(degree==BS))

where the two BVFs above are represented by MDDs 1102a-b, respectively. Attributes may be listed in a common order to facilitate combining into MDD 1100. A general attribute order for all MDDs may facilitate the reuse of MDDs. In general, there may exist a range of attribute values satisfying or failing a particular restriction that may be simplified. For example, in MDD 1100 "hs" and "bs" always occur together as well as "ms" and "phd."

Figure 12:
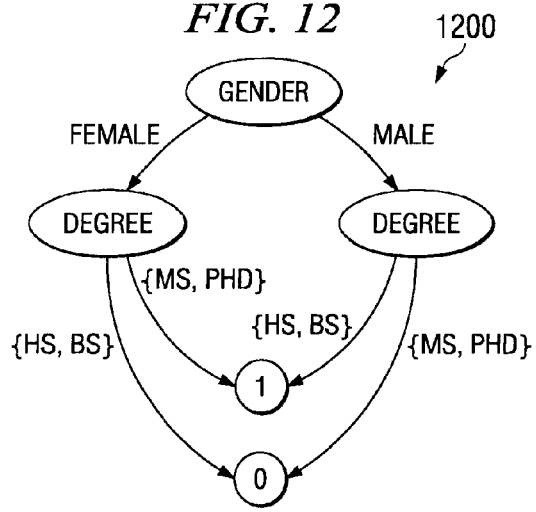
FIG. 12 is an example of a simplified MDD that uses attribute domain partitions.

FIG. 12 is an example of a simplified MDD 1200 that uses attribute domain partitions. Here, the number of edges after the degree attributes has been reduced by half by combining the range of attribute values hs and bs into an attribute domain partition (ADP) including {hs,bs} and the range ms and phd into ADP {ms,phd}.

Figure 13:
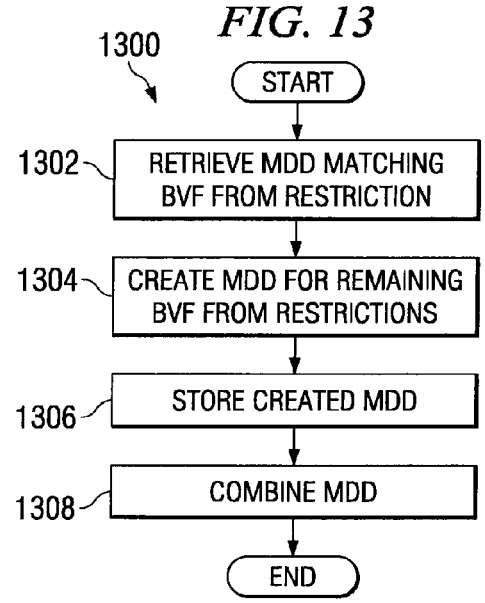
FIG. 13 is a flow chart showing an example of a process for creating an MDD.

FIG. 13 is a flow chart showing an example of a method 1300 for creating an MDD. For example, inventory management module 304 may create an MDD in response to a request from publisher 106 to create an ad slot. Method 1300 may be performed during the generation of the second-level multi-tier directed graph at step 812 in application 130. At the highest level, method 1300 includes identifying an intersection between restrictions that shares at least one common element, subtracting the common subset and putting the subset in an RDP (if an intersection becomes empty, discard it), and repeating until no restrictions remain.

Illustrated method 1300 begins at step 1302, with retrieving any MDDs matching BVFs from restrictions associated with placements. For example, ad inventory management module 304 may retrieve MDD 1102a from local memory 120. At step 1304, application 130 creates any MDDs for remaining BVFs from the restrictions. For example, ad inventory management module 304 may create MDD 1102b. Application 130 stores, at step 1306, any MDDs that were created. For example, ad inventory management module 304 may store MDD 1102b in local memory 120. At step 1308, application 130 combines any created and/or retrieved MDDs to form an MDD matching the restrictions. For example, ad inventory management module 304 may combine MDDS 1102a-b to form MDD 1100.

Figure 14:
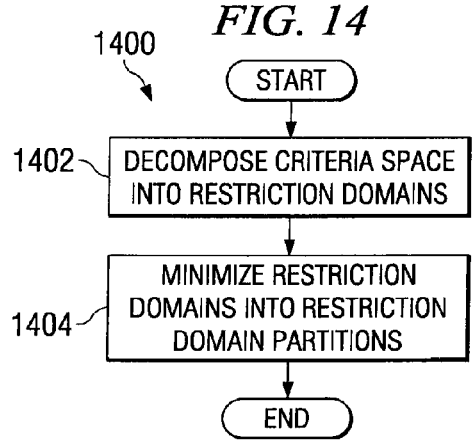
FIG. 14 is a flow chart showing an example of a process for minimizing a restriction domain into one or more restriction domain partitions.

FIG. 14 is a flow chart showing an example of a method 1400 for minimizing a restriction domain into one or more restriction domain partitions. Each sub-slot in a second-level multi-tier directed graph corresponds to a restriction domain partition (RDP). Sub-slots are derived from ad slots using restriction conditions of placements to which the ad slots belong. Method 1400 may be performed during the generation of the second-level multi-tier directed graph at step 812 in application 130. Method 1400 begins, at step 1402, with decomposing a criteria space into restriction domains. For example, a product catalog containing three placements may use the following three BVFs:

R1=(gender==female)
R2=(degree==MS)
R3=[no restrictions]

These BVFs may be expressed as a Cartesian product of the possible combinations of attribute values as in the following table:

| Attributes | | Restrictions | | | RDPs | | | |
|---|---|---|---|---|---|---|---|---|
| Gender | Degree | R1 | R2 | R3 | RDP1 | RDP2 | RDP3 | RDP4 |
| male | HS | | | X | | | | O |
| male | BS | | | X | | | | O |
| male | MS | | X | X | | | O | |
| male | PHD | | | X | | | | O |
| female | HS | X | | X | | O | | |
| female | BS | X | | X | | O | | |
| female | MS | X | X | X | O | | | |
| female | PHD | X | | X | | O | | |

In the above example, X symbolizes a combination of attribute values that satisfies the restriction. Each column under restrictions in the table above represents a decomposed domain of a restriction.

At step 1404, the restriction domains are minimized into restriction domain partitions (RDPs). In one implementation, each RDP is then represented as a sub-slot in a second-level multi-tier directed graph. For example, in the table above, four RDPs are found that each restriction domain may be expressed as a combination of Each 0 in the table above indicates that the Cartesian product element is a member of that RDP (e.g., male/HS is a member of RDP4). Each RDP may be expressed as a BVF:

RDP1=(gender==female)&(degree==ms)
RDP2=(gender==female)&(degree!=ms)
RDP3=(gender==male)&(degree==ms)
RDP4=(gender==male)&(degree!=ms)

And each restriction can be expressed as a sum of one or more RDPs:

R1=RDP1+RDP2
R2=RDP1+RDP3
R3=RDP1+RDP2+RDP3+RDP4

In one implementation, the execution of step 1404 can include the performance of the following algorithm:

```
def partition(restrictions):
    rdps=[ ]
    while restrictions:
    # Find a non-empty intersection between the first
    # restriction and all of the others.
    common=restrictions[0]
    for r in restrictions [1:]:
        intersection=common & r
        if intersection:
    common=intersection
    # Add it to the list of partitions.
    rdps.append(common)
    # Then remove it from all other restrictions, discarding
    # any restrictions that become empty.
    for i in xrange(len(restrictions)):
        new_bvf=restrictions.pop(0)-common
        if new_bvf:
            restrictions.append(new_bvf)
    return rdps
```

It will be understood that the foregoing pseudocode is for illustration purposes only and may not represent certain implementations or other alternative steps.

Figure 15:
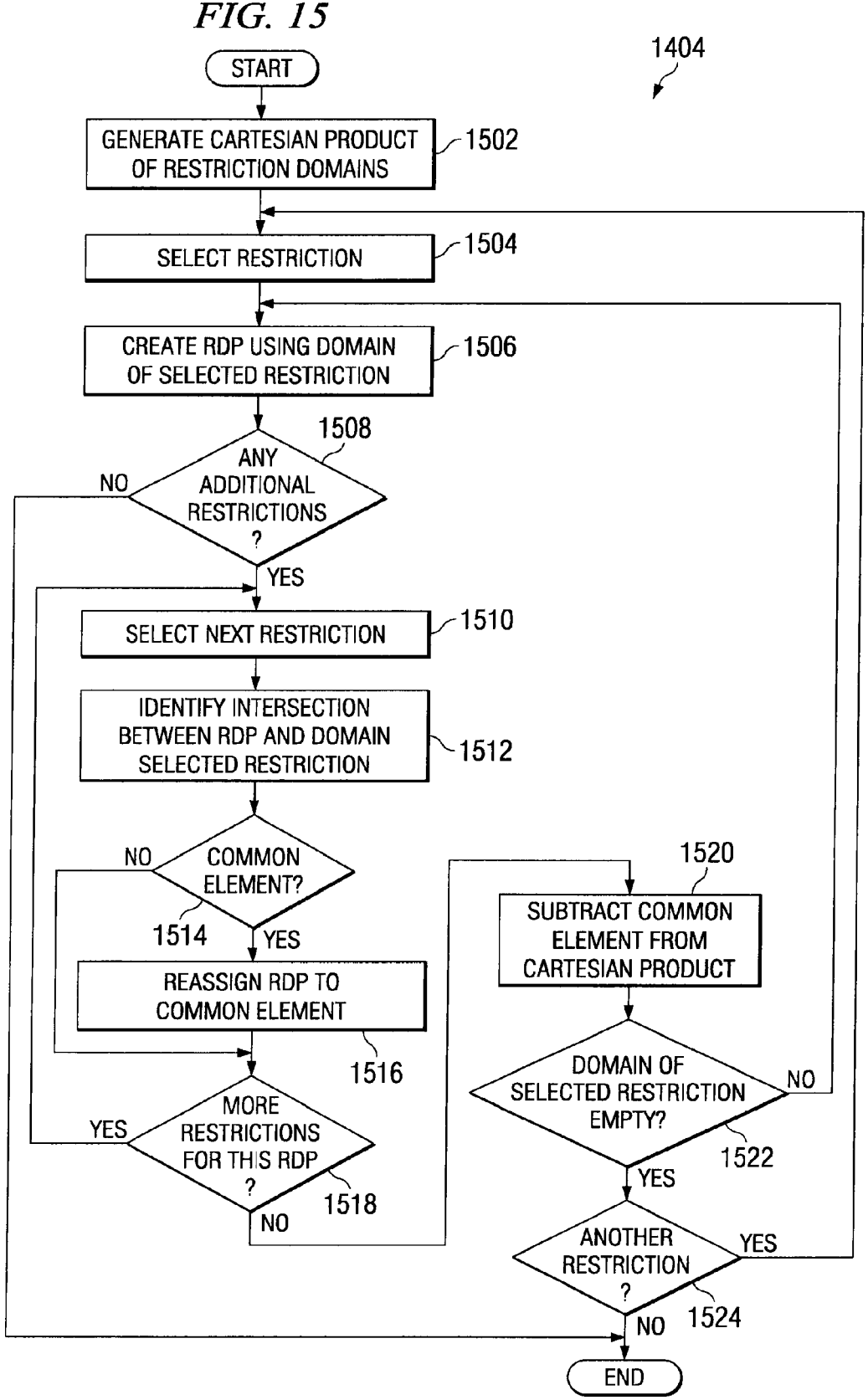
FIG. 15 is a flow chart showing an example of a process for creating restriction domain partitions.

In another implementation, step 1404 can be implemented by first receiving, selecting, or otherwise identifying the set of restrictions as MDDs R={r1, r2, . . . , rn} as input. The set of restrictions can then be processed in order to output the set of disjoint restrictions as MDDs D. This processing may include the following steps:

1. While R !=0
2. Remove a restriction r from R
3. For every restriction d in D, compute the MDDs for r ^¬ d, r ^d and ¬ r ^d. Then remove d from D and insert the newly computed MDDs.
4. Return D FIG. 15 is a flow chart showing an example of a method 1404 for creating restriction domain partitions. In other words, method 1404 provides one example of the processing represented in step 1404 in FIG. 14. Method 1404 begins at step 1502, where a Cartesian product of restriction domains is generated. For example, a Cartesian product is generated in the table above for the female, MS, and no restriction domains.

At step 1504, a first restriction is selected. For example, in the table above, in the description of FIG. 14, R1 might be selected first, then R2, and finally R3. At step 1506, an RDP is created using the domain of the selected restriction, at step 1510. For example, if the rows in the table above are referred to as domain elements, then the domains of the restrictions are:

R1={row 5, row 6, row 7, row 8}
R2={row 3, row 7}
R3={row 1, row 2, row 3, row 4, row 5, row 6, row 7, row 8}

And the RDP1, based on the R1 restriction, would be:
RDP1={row 5, row 6, row 7, row 8}

If no other restriction exists (as shown at decisional step 1508), then the method may discontinue or pause processing this particular domain.

But if, at step 1508, at least one other restriction exists, then next restriction is selected at step 1510. At step 1512, an intersection between the created RDP and the selected other restriction is identified. For example, R2 is selected as the other restriction and intersected with RDP1. If, at step 1514, there are one or more common elements in the identified intersection, then the RDP is reassigned to the one or more common elements, at step 1516. For example, R1 and R2 have 7 in common, so RDP1 is reassigned to {row 7}. Otherwise, if there are no elements in common or the RDP has been reassigned, and if another restriction exists at step 1518, then another restriction is selected, at step 1510. For example, RDP1 is now compared to R3 to determine if "row 7" is common and that RDP1 remains {row 7}.

If no other restrictions exist, then any common elements remaining in the RDP are subtracted from the Cartesian product, at step 1520. For example, {row 7} (i.e., {female,MS}) is removed from R1, R2, and R3. The restrictions now include:
R1={row 5, row 6, row 8}
R2={row 3}
R3={row 1, row 2, row 3, row 4, row 5, row 6, row 8}
And RDP1 is now:
RDP1={row 7}
If, at step 1522, the domain of the selected restriction is not empty, then another RDP is created at step 1506. For example, R1 still includes {row 5, row 6, row 8}. After application 130 creates RDP2, then the example restrictions include:
R1={no rows}
R2={row 3}
R3={row 1, row 2, row 3, row 4}
And the RDPs are:
RDP1={row 7}
RDP2={row 5, row 6, row 8}
At this point in the example processing, the domain of the selected restriction is empty at step 1522. If, at step 1524, another restriction exists, then method 1404 returns to step 1504 and selects the next restriction. For example, R2 still remains after processing is complete on R1. Accordingly, application 130 selects R2, creates another RDP and compares it to each of the remaining restrictions (in this example, R3). The restrictions now include:
R1={no rows}
R2={no rows}
R3={row 1, row 2, row 4}
And the RDPs are:
RDP1={row 7}
RDP2={row 5, row 6, row 8}
RDP3={row 3}
One final loop is made for R3 resulting in the four RDPs:
RDP1={row 7}
RDP2={row 5, row 6, row 8}
RDP3={row 3}
RDP4={row 1, row 2, row 4}
The four RDPs may now be used as sub-slots when generating a second-level multi-tier directed graph based on the restrictions, R1, R2, and R3.

The preceding flowcharts and accompanying descriptions illustrate exemplary methods. But system 100 contemplates using any suitable technique for performing these and other tasks. Accordingly, many of the steps in these flowcharts may take place simultaneously and/or in different orders than as shown. Moreover, the system 100 may use methods with additional steps, fewer steps, and/or different steps, so long as the methods remain appropriate. For example, it will be understood that the client may execute portions of the processes described in the methods in parallel or in sequence.

A number of embodiments have been described. Nevertheless, it will be understood that various modifications may be made without departing from the spirit and scope of the disclosure. For example, while advertisers 108 are described herein as being remote from ad server 102, in certain implementations, ad server 102 includes or performs the actions of advertisers 108. In other words, the entity (whether an enterprise, organization, small business, or person) implementing, hosting or controlling ad server 102 may also perform roles as advertiser 108, as well as publisher 106. Moreover, it is not required that the client and server reside within the same environment, system, or network, as described. Indeed, the particular client and the particular server may be unrelated either logically or physically (beyond some connection) and reside in different parts of the globe. Accordingly, other embodiments are within the scope of the following claims.

What is claimed is:

1. A computer-readable hardware storage device encoded with a computer program product for managing network ad availability, the computer program product comprising computer readable instructions that, when executed by one or more processors of an ad server, cause the one or more processors to:
generate, by the ad server, a directed graph representing a network property associated with a publisher, the network property associated with at least one product catalog representing a package of network ad slots, the directed graph including nodes representing sub-placements corresponding to various characteristic constraints of the network property and nodes representing sub-slots for network ad slots included in the sub-placements;
determine, by the ad server, a flow through the directed graph, with the flow being determined in accordance with one or more of (i) the characteristic constraints, (ii) a reservation impression constraint that specifies a number of impressions requested by an advertiser, (iii) a forecasted impression constraint that restricts a number of forecasted impressions assigned to the sub-slots, or (iv) an objective for the sub-slots;
wherein the flow is associated with a particular period of time in which ads are assigned to a plurality of forecasted impressions for a first of the network ad slots;
assign, by the ad server based on the determined flow, the ads to the plurality of forecasted impressions for the particular period of time;
generate, by the ad server based on assignment of the ads to the plurality of forecasted impressions, an ad service plan for serving various ones of the ads associated with the first of the network ad slots, wherein the ad service plan is a plan that specifies which ads will be served in each of the plurality of forecasted impressions for the first of the network ad slots during the particular period of time; and
cache the ad service plan prior to receipt of an ad request from the publisher for delivery of at least one of the ads associated with the first of the network ad slots.

2. The computer-readable hardware storage device of claim 1 further operable to communicate a particular ad to the publisher for service at the network property in response to the ad request from the publisher and based on the generated ad service plan.

3. The computer-readable hardware storage device of claim 2, the ad service plan associating a priority with each of the ads.

4. The computer-readable hardware storage device of claim 2 further operable to cache the ad service plan in a local cache, whereby response time to the ad request is decreased.

5. The computer-readable hardware storage device of claim 1 further operable to execute a smoothing process on the generated ad service plan.

6. The computer-readable hardware storage device of claim 5 further operable to generate an availability result for the network property in response to an availability query, the availability result substantially similar to the generated ad service plan.

7. The computer-readable hardware storage device of claim 6, further operable to receive the availability query from a portal operable to be accessed by a plurality of authorized publishers.

8. The computer-readable hardware storage device of claim 1 further operable to:
 collect product catalog information about the network property, the product catalog information comprising a product catalog identifier, at least one placement identifier, and at least two ad slot identifiers; and
 use the collected information when generating the directed graph.

9. An ad server for managing ad serving comprising:
 one or more processors operable to:
  generate, by the one or more processors, a directed graph representing a network property associated with a publisher, the network property associated with at least one product catalog representing a package of network ad slots, the directed graph including nodes representing sub-placements corresponding to various characteristic constraints of the network property and nodes representing sub-slots for network ad slots included in the sub-placements;
  determine, by the one or more processors, a flow through the directed graph, with the flow being determined in accordance with one or more of (i) the characteristic constraints, (ii) a reservation impression constraint that specifies a number of impressions requested by an advertiser, (iii) a forecasted impression constraint that restricts a number of forecasted impressions assigned to the sub-slots, or (iv) an objective for the sub-slots;
  wherein the flow is associated with a particular period of time in which ads are assigned to a plurality of forecasted impressions for a first of the network ad slots;
  assign, by the one or more processors based the determined flow, the ads to the plurality of forecasted impressions for the particular period of time;
  generate, by the one or more processors based on assignment of the ads to the plurality of forecasted impressions, an ad service plan for serving various ones of the ads associated with the first of the network ad slots, wherein the ad service plan is a plan that specifies which ads will be served in each of the plurality of forecasted impressions for the first of the network ad slots during the particular period of time; and
  cache the ad service plan prior to receipt of an ad request from the publisher for delivery of at least one of the ads associated with the first of the network ad slots.

10. The ad server of claim 9, the one or more processors further operable to communicate a particular ad to the publisher for service at the network property in response to the ad request from the publisher and based on the generated ad service plan.

11. The ad server of claim 10, the ad service plan associating a priority with each of the ads.

12. The ad server of claim 10, the one or more processors further operable to cache the ad service plan in a local cache, whereby response time to the ad request is decreased.

13. The ad server of claim 9, the one or more processors further operable to execute a smoothing process on the generated ad service plan.

14. The ad server of claim 13, the one or more processors further operable to generate an availability result for the network property in response to an availability query, the availability result substantially similar to the generated ad service plan.

15. The ad server of claim 14, wherein the one or more processors are operable to receive the availability query from a portal operable to be accessed by a plurality of authorized publishers.

16. The ad server of claim 9, the one or more processors further operable to:
 collect product catalog information about the network property, the product catalog information comprising a product catalog identifier, at least one placement identifier, and at least two ad slot identifiers; and
 use the collected information when generating the directed graph.

17. The ad server of claim 9, wherein the iterative processing includes initializing the graph based, at least in part, on a number of forecasted impressions and a number of reserved impressions for sub-slots of the first ad slot.

18. The ad server of claim 9, wherein the ad service plan does not specify an advertisement for at least one forecasted impression for the first ad slot during the period of time.

19. The ad server of claim 9, wherein:
 the graph further comprises a source node, a sink node, a respective edge between the source node and each node representing a sub placement, edges between the nodes representing the sub placements and nodes representing the sub slots, and a respective edge between the sink node and each node representing a sub slot; and
 the iterative process determines a flow through the graph from the source node to the sink node.

20. The ad server of claim 19, wherein the one or more processors are further operable to:
 initialize an edge weight for each edge between each node representing a sub slot and the sink node to be a forecasted number of impressions for the sub slot; and
 initialize an edge weight for each edge between the source node and each node representing a sub placement to be a number of reserved impressions for the sub placement.

21. The ad server of claim 9, wherein determining a flow through the graph comprises determining a maximal flow through the graph.

22. A computer-implemented method for managing ad serving, the method comprising:
 generating, by an ad server, a directed graph representing a network property associated with a publisher, the network property associated with at least one product catalog representing a package of network ad slots, the directed graph including nodes representing sub-placements corresponding to various characteristic constraints of the network property and nodes representing sub-slots for network ad slots included in the sub-placements;
 determining, by one or more processors, a flow through the directed graph, with the flow being determined in accordance with one or more of (i) the characteristic constraints, (ii) a reservation impression constraint that specifies a number of impressions requested by an advertiser, (iii) a forecasted impression constraint that restricts a number of forecasted impressions assigned to the sub-slots, or (iv) an objective for the sub-slots;

wherein the flow is associated with a particular period of time in which ads are assigned to a plurality of forecasted impressions for a first of the network ad slots;

assigning, by the one or more processors based on the determined flow, the ads to the plurality of forecasted impressions for the particular period of time;

generating, by the ad server based on assignment of the ads to the plurality of forecasted impressions, an ad service plan for serving various ones of the ads associated with the first of the network ad slots, wherein the ad service plan is a plan that specifies which ads will be served in each of the plurality of forecasted impressions for the first of the network ad slots during the particular period of time; and caching the ad service plan prior to receipt of an ad request from the publisher for delivery of at least one of the ads associated with the first of the network ad slots.

* * * * *